US012405551B2

(12) United States Patent
Tanaka et al.

(10) Patent No.: US 12,405,551 B2
(45) Date of Patent: Sep. 2, 2025

(54) DEVELOPING DEVICE AND IMAGE FORMING APPARATUS HAVING OPERATION MODE FOR CLEANING

(71) Applicant: FUJIFILM Business Innovation Corp., Tokyo (JP)

(72) Inventors: Arichika Tanaka, Kanagawa (JP); Yutaka Kiuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/444,174

(22) Filed: Feb. 16, 2024

(65) Prior Publication Data

US 2025/0102950 A1 Mar. 27, 2025

(30) Foreign Application Priority Data

Sep. 22, 2023 (JP) ................................ 2023-158338

(51) Int. Cl.
*G03G 15/08* (2006.01)
*G03G 15/00* (2006.01)
*G03G 21/18* (2006.01)

(52) U.S. Cl.
CPC ..... *G03G 15/0844* (2013.01); *G03G 15/0891* (2013.01); *G03G 15/757* (2013.01); *G03G 21/1857* (2013.01); *G03G 2215/0827* (2013.01); *G03G 2221/1633* (2013.01)

(58) Field of Classification Search
CPC .......... G03G 15/0844; G03G 15/0891; G03G 15/757; G03G 21/1857; G03G 2221/1657; G03G 2215/0805; G03G 2215/0827; G03G 2221/1633; G03G 21/105
See application file for complete search history.

(56) References Cited

U.S. PATENT DOCUMENTS

2012/0020688 A1* 1/2012 Yotsutsuji ........... G03G 15/095
399/272

FOREIGN PATENT DOCUMENTS

JP 05-314906 A 11/1993
JP 06230668 A * 8/1994

* cited by examiner

*Primary Examiner* — Stephanie E Bloss
*Assistant Examiner* — Laura Roth
(74) *Attorney, Agent, or Firm* — Sughrue Mion, PLLC

(57) ABSTRACT

A developing device includes a developer holder that supplies developer to an image carrier on which an electrostatic latent image is formed. The developing device further includes a removing member that removes the developer that has not been supplied to the image carrier and remains on the developer holder and a transport unit that includes a helical rotating body, the transport unit rotating the rotating body to transport the developer and supply the developer to the developer holder. The developing device further includes an accommodating unit that accommodates the developer holder, the removing member, and the transport unit; and a drive mechanism that operates the developer holder and the transport unit together in a first operation mode for image formation and operates the developer holder and the transport unit individually in a second operation mode for cleaning an inside of the accommodating unit by removing the developer.

11 Claims, 7 Drawing Sheets

DEVELOPING DEVICE AND IMAGE FORMING APPARATUS HAVING OPERATION MODE FOR CLEANING

CROSS-REFERENCE TO RELATED APPLICATIONS

This application is based on and claims priority under 35 USC 119 from Japanese Patent Application No. 2023-158338 filed Sep. 22, 2023.

BACKGROUND

(i) Technical Field

The present disclosure relates to a developing device and an image forming apparatus.

(ii) Related Art

An electrophotographic image forming apparatus typically uses developer containing toner and carrier. This type of developer gradually deteriorates with use, and the deterioration of the developer leads to a reduction in the image quality. Therefore, the developer in the developing device needs to be replaced regularly.

Japanese Unexamined Patent Application Publication No. 6-230668 describes a method for discharging developer from a container. This method includes opening a developer discharge port; repeating reverse rotation of transport units (transport screws) for discharging the developer accumulated at the bottom of the container and forward rotation of a developer carrier for scraping off the developer on the developer carrier to the bottom of the container with a separating member; and then performing reverse rotation of the transport units to discharge the developer that has been scraped off.

SUMMARY

When the transport units are operated together with the developer holder in the process of removing the developer from the developer holder, the developer is supplied from the transport units to the developer holder. The developer supplied from the transport units adheres to the developer holder, and therefore the developer discharge efficiency is reduced.

Aspects of non-limiting embodiments of the present disclosure relate to a structure for increasing the developer discharge efficiency compared to when the transport units operate together with the developer holder in the process of discharging the developer.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including developer holder that supplies developer to an image carrier on which an electrostatic latent image is formed; a removing member that removes the developer that has not been supplied to the image carrier and remains on the developer holder; a transport unit that includes a helical rotating body, the transport unit rotating the rotating body to transport the developer and supply the developer to the developer holder; an accommodating unit that accommodates the developer holder, the removing member, and the transport unit; and a drive mechanism that operates the developer holder and the transport unit together in a first operation mode for image formation and operates the developer holder and the transport unit individually in a second operation mode for cleaning an inside of the accommodating unit by removing the developer.

BRIEF DESCRIPTION OF THE DRAWINGS

An exemplary embodiment of the present disclosure will be described in detail based on the following figures, wherein:

FIG. 7 illustrates the structure of the drive mechanism that distributes the driving force when the solenoid switch is ON.

DETAILED DESCRIPTION

An exemplary embodiment of the present disclosure will now be described in detail with reference to the accompanying drawings.

Structure of Image Forming Apparatus

Figure 1:
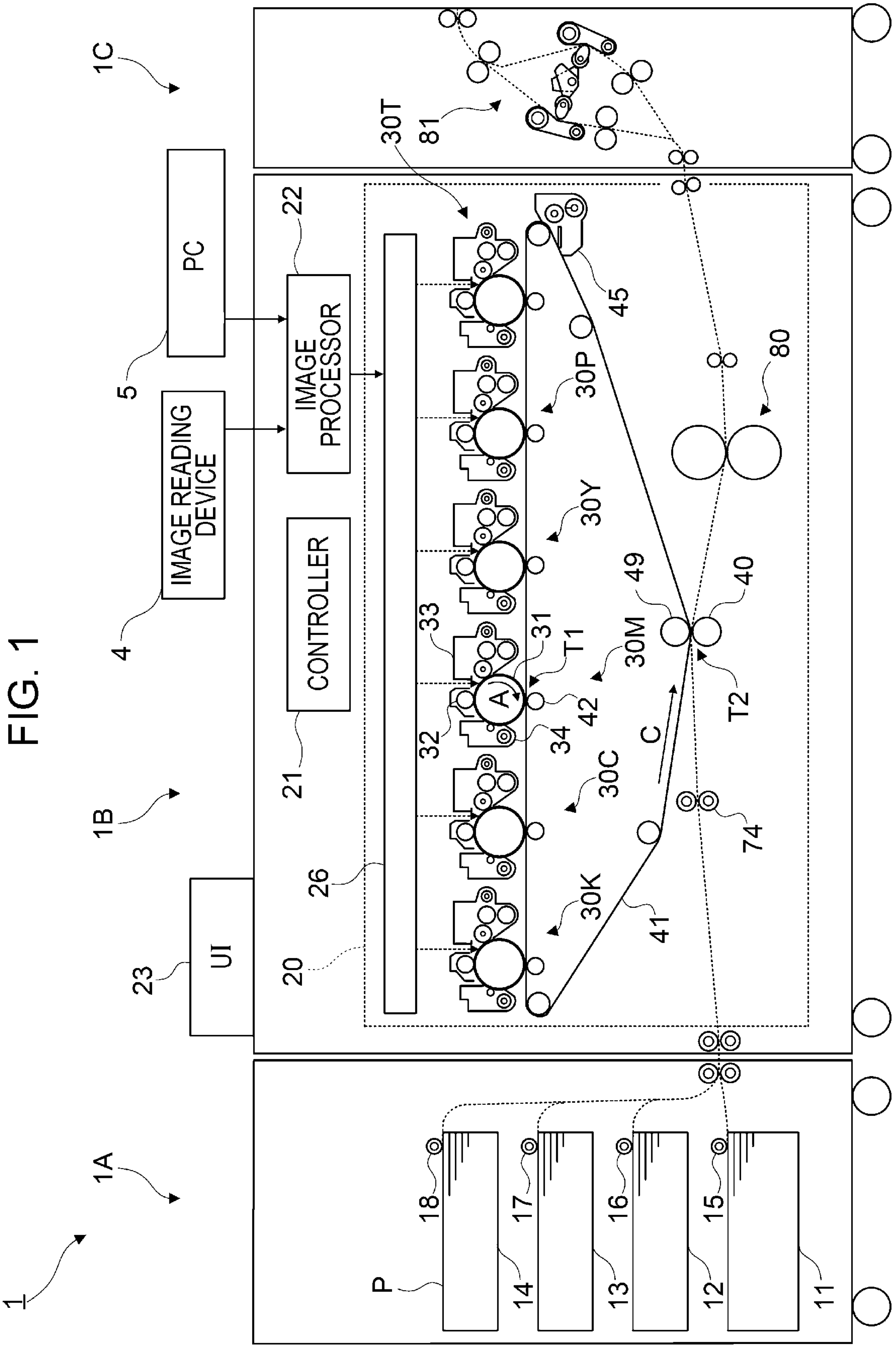
FIG. 1 illustrates an image forming apparatus to which the exemplary embodiment is applied.

FIG. 1 illustrates an image forming apparatus 1 to which the present exemplary embodiment is applied. The image forming apparatus 1 according to the present exemplary embodiment includes a paper feed unit 1A, a print unit 1B, and a paper output unit 1C. The paper feed unit 1A includes first to fourth paper storage members 11 to 14 that store paper sheets P serving as examples of recording media. The paper feed unit 1A includes feed rollers 15 to 18 provided for the first to fourth paper storage members 11 to 14, respectively, to deliver the paper sheets P stored in the respective paper storage members to a transport path connected to the print unit 1B.

The print unit 1B includes an image forming section 20 in which an image is formed on each paper sheet P. The print unit 1B also includes a controller 21 that controls components of the image forming apparatus 1. In the present exemplary embodiment, the controller 21 controls the operation of each developing unit 33 of the image forming section 20 described below in a first operation mode, which is an operation mode for image formation, and a second operation mode, which is an operation mode for cleaning the developing unit 33. The operation performed in each operation mode will be described in detail below. The print unit 1B also includes an image processor 22. The image processor 22 performs an image process on image data transmitted from an image reading device 4 or a personal computer (PC) 5. The print unit 1B also includes a user interface (UI) 23 composed of, for example, a touch panel for presenting information to a user and receiving information from the user.

The image forming section 20, which is an example of image forming means, includes six image forming units 30T, 30P, 30Y, 30M, 30C, and 30K (hereinafter sometimes referred to simply as "image forming units 30") arranged in parallel with uniform spacing therebetween. Each image forming unit 30 includes a photoconductor drum 31 on which an electrostatic latent image is formed while the photoconductor drum 31 rotates in the direction of arrow A; a charging roller 32 that charges a surface of the photoconductor drum 31; the developing unit 33 that develops the electrostatic latent image formed on the photoconductor drum 31; and a drum cleaner 34 the removes toner and the like from the surface of the photoconductor drum 31.

The image forming section 20 also includes an exposure device 26 that exposes the photoconductor drum 31 of each image forming unit 30 to laser light. The light to which the photoconductor drum 31 is exposed by the exposure device 26 is not limited to laser light. For example, a light source, such as a light emitting diode (LED), may be provided for each image forming unit 30, and the photoconductor drum 31 may be exposed to light emitted from the light source.

The image forming units 30 have the same structure except for the toner contained in the developing units 33. The image forming units 30Y, 30M, 30C, and 30K respectively form yellow (Y), magenta (M), cyan (C), and black (K) toner images. The image forming units 30T and 30P form toner images using, for example, toner of a corporate color, foaming toner for printing Braille characters, toner of a fluorescent color, or toner used to improve glossiness. In other words, the image forming units 30T and 30P form toner images using toners of special colors.

The image forming section 20 also includes an intermediate transfer belt 41 to which the toner images of respective colors formed on the photoconductor drums 31 of the image forming units 30 are transferred. The image forming section 20 also includes first transfer rollers 42 that transfer the toner images of the respective colors formed by the image forming units 30 onto the intermediate transfer belt 41 in first transfer regions T1. The image forming section 20 also includes a second transfer roller 40 that simultaneously transfers the toner images transferred to the intermediate transfer belt 41 to the paper sheet P in a second transfer region T2. The image forming section 20 also includes a belt cleaner 45 that removes toners and the like from a surface of the intermediate transfer belt 41, and a fixing device 80 that fixes the images transferred to the paper sheet P in the second transfer process to the paper sheet P.

The image forming section 20 performs an image forming operation based on a control signal transmitted from the controller 21. More specifically, first, the image forming section 20 causes the image processor 22 to perform the image process on the image data received from the image reading device 4 or the PC 5 and supply the resulting image data to the exposure device 26. Then, in, for example, the magenta (M) image forming unit 30M, the charging roller 32 charges the surface of the photoconductor drum 31, and the exposure device 26 irradiates the photoconductor drum 31 with laser light modulated based on the image data obtained from the image processor 22.

Thus, an electrostatic latent image is formed on the photoconductor drum 31. The formed electrostatic latent image is developed by the developing unit 33, so that a magenta toner image is formed on the photoconductor drum 31. Similarly, the image forming units 30Y, 30C, and 30K respectively form yellow, cyan, and black toner images, and the image forming units 30T and 30P form toner images of special colors.

The toner images of the respective colors formed by the image forming units 30 are successively electrostatically transferred to the intermediate transfer belt 41 rotating in the direction of arrow C in FIG. 1 by the first transfer rollers 42, so that the toner images are superposed on the intermediate transfer belt 41. The superposed toner images on the intermediate transfer belt 41 are transported toward the second transfer region T2 including the second transfer roller 40 and a backup roller 49 as the intermediate transfer belt 41 moves.

The paper sheet P is fed from, for example, the first paper storage member 11 by the feed roller 15, and then is transported to the position of the registration roller 74 along the transport path. The registration roller 74 supplies the paper sheet P to the second transfer region T2 at the time when the superposed toner images are transported to the second transfer region T2. The superposed toner images are simultaneously electrostatically transferred to the paper sheet P by a transferring electric field formed between the second transfer roller 40 and the backup roller 49 in the second transfer region T2.

After that, the paper sheet P to which the superposed toner images have been electrostatically transferred is transported to the fixing device 80. The fixing device 80 performs a fixing process in which the paper sheet P having the unfixed toner images formed thereon is heated and pressed so that the toner images are fixed to the paper sheet P. The paper sheet P that has undergone the fixing process passes through a paper straightening section 81 provided in the paper output unit 1C, and is transported to a paper stacking portion (not illustrated).

Structure of Developing Unit 33

Figure 2:
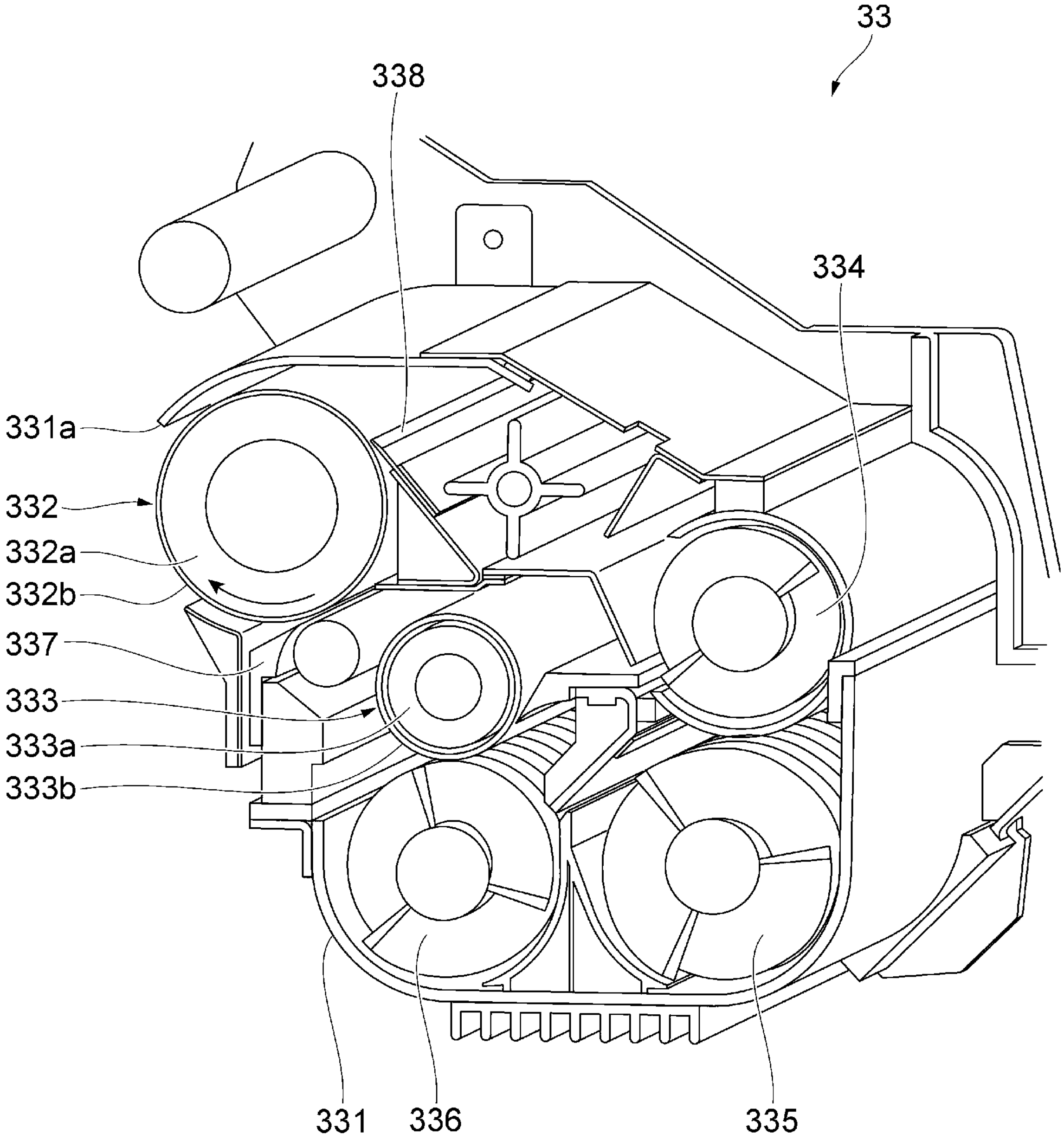
FIG. 2 illustrates the structure of a relevant part of a developing unit.

FIG. 2 illustrates the structure of the developing unit 33. FIG. 2 is a perspective view of the developing unit 33 viewed in the direction from the front (near side of FIG. 1) to the rear (far side of FIG. 1) of the print unit 1B included in the image forming apparatus 1 illustrated in FIG. 1, and illustrates a sectional view taken at a location near the front end.

The developing unit 33 includes an accommodating unit 331 disposed adjacent to the photoconductor drum 31 and composed of a housing extending in the front-to-rear direction of the print unit 1B. The accommodating unit 331 has an opening 331*a* at a position facing the photoconductor drum 31. The accommodating unit 331 accommodates a developing roller 332, a pickup roller 333, a first transport unit 334, a second transport unit 335, a third transport unit 336, a regulating member 337, and a removing member 338 together with developer. The members accommodated in the accommodating unit 331 are elongated members having similar lengths, and are disposed substantially parallel to each other. The developer contained in the accommodating unit 331 is a mixture of toner used to form an image and carrier composed of magnetic particles for carrying the toner.

The developing roller 332 includes a solid cylindrical shaft member 332*a* and a hollow cylindrical sleeve 332*b* that covers the shaft member 332*a*. The developing roller 332 is disposed such that a side surface of the sleeve 332*b* is partially exposed at the opening 331*a* in the accommodating unit 331 and that the exposed surface faces the photoconductor drum 31. The shaft member 332*a* exerts a magnetic force. The sleeve 332*b* rotates around the shaft member 332*a* in the direction shown by the arrow. The developing roller 332 causes the developer to adhere to the surface of the sleeve 332*b* in response to the magnetic force of the shaft member 332*a*, and rotates the sleeve 332*b* to convey the developer to the opening 331*a*, so that the toner adheres to the charged photoconductor drum 31 to develop an electrostatic latent image. The developing roller 332 is an example of a developer holder.

The pickup roller 333 is disposed adjacent and parallel to the developing roller 332. The pickup roller 333 includes a solid cylindrical shaft member 333*a* and a hollow cylindrical sleeve 333*b* that covers the shaft member 333*a*. The shaft member 333*a* exerts a magnetic force. The sleeve 333*b* rotates around the shaft member 333*a*. The pickup roller 333 causes the developer to adhere to the surface of the sleeve 333*b* in response to the magnetic force of the shaft member 333*a*, and rotates the sleeve 333*b* to convey and transfer the developer to the developing roller 332. The pickup roller 333 is an example of a developer relay unit.

Each of the first transport unit 334, the second transport unit 335, and the third transport unit 336 is an auger having a helical blade around a rotating shaft. The first transport unit 334, the second transport unit 335, and the third transport unit 336 are disposed in the accommodating unit 331 such that rotating shafts thereof are parallel to the developing roller 332 and the pickup roller 333. The first transport unit 334, the second transport unit 335, and the third transport unit 336 are rotated around the rotating shafts thereof so that the developer is stirred and transported in the directions along the rotating shafts of the transport units 334 to 336. The developer is transported along the first transport unit 334, the second transport unit 335, and the third transport unit 336 in that order as the first transport unit 334, the second transport unit 335, and the third transport unit 336 rotate, and is supplied from the third transport unit 336 to the pickup roller 333. The direction in which the developer is transported to be supplied to the pickup roller 333 in the image forming operation is referred to as a "forward direction".

The regulating member 337 is disposed downstream of the position at which the sleeve 332*b* faces the pickup roller 333 and upstream of the position at which the developing roller 332 faces the photoconductor drum 31 along the side surface of the developing roller 332. Here, the terms "downstream" and "upstream" respectively refer to downstream and upstream in the direction in which the sleeve 332*b* of the developing roller 332 rotates. The regulating member 337 levels off the developer supplied by the pickup roller 333 and held on the surface of the sleeve 332*b* of the developing roller 332 so that the height of the developer is constant. The developer removed by the regulating member 337 is collected in the accommodating unit 331 and returned to the transport path composed of the first transport unit 334, the second transport unit 335, and the third transport unit 336.

The removing member 338 is disposed downstream of the position at which the sleeve 332*b* faces the photoconductor drum 31 along the side surface of the developing roller 332. The term "downstream" refers to downstream in the direction in which the sleeve 332*b* of the developing roller 332 rotates. The removing member 338 scrapes off the developer remaining on the surface of the sleeve 332*b* after the developer is supplied from the developing roller 332 to the photoconductor drum 31. The developer removed from the developing roller 332 by the removing member 338 is collected in the accommodating unit 331 and returned to the transport path composed of the first transport unit 334, the second transport unit 335, and the third transport unit 336.

Discharge and Introduction of Developer

Figure 3:
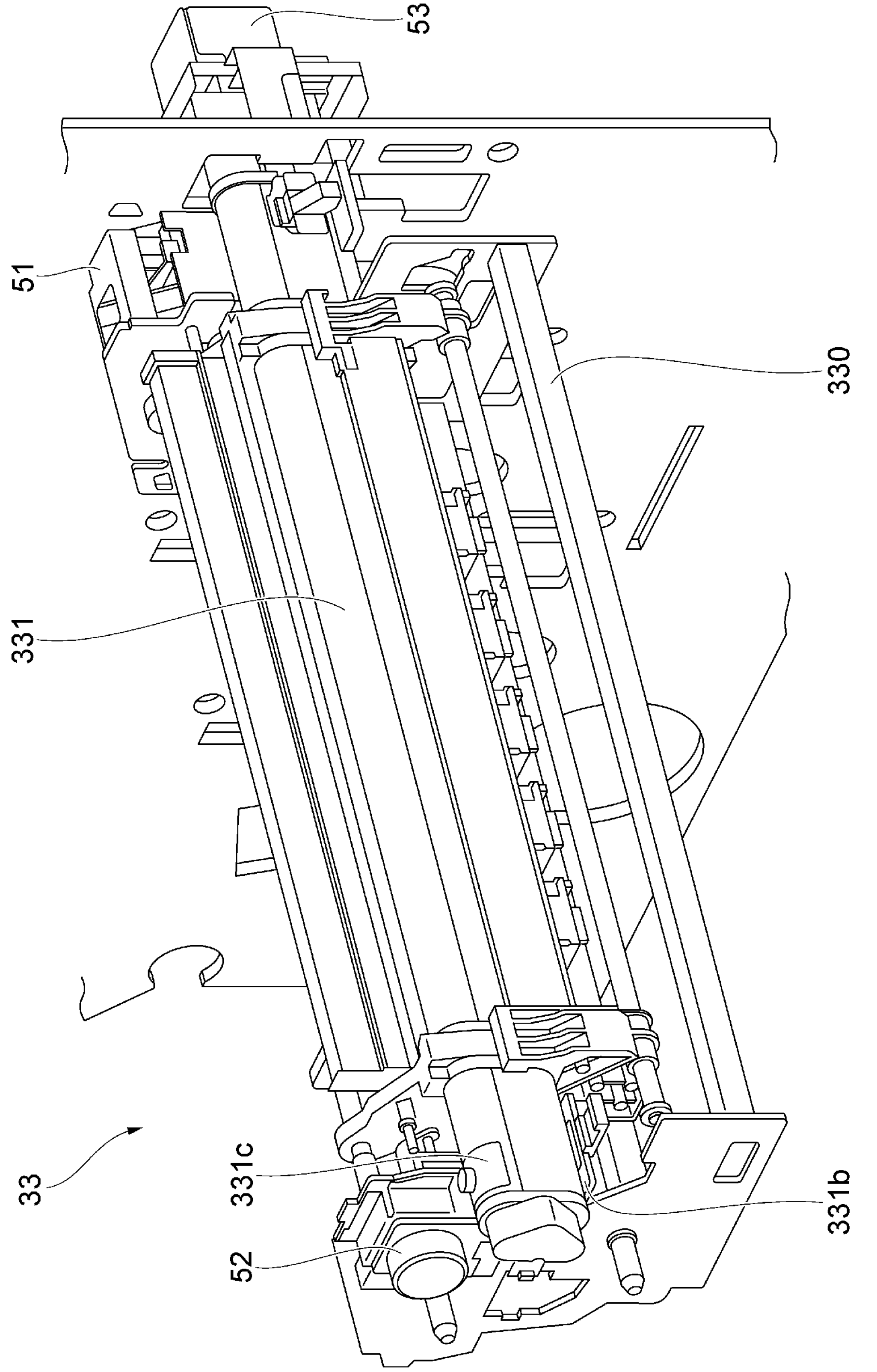
FIG. 3 illustrates the overall structure of the developing unit.

FIG. 3 illustrates the overall structure of the developing unit 33. The developing unit 33 extends in the front-to-rear direction of the print unit 1B. The developing unit 33 includes a frame 330 that supports the accommodating unit 331 and the developing roller 332, the pickup roller 333, the first to third transport units 334 to 336, the regulating member 337, and the removing member 338 accommodated in the accommodating unit 331.

The accommodating unit 331 has a discharge port 331*b* and a filling port 331*c* that are capable of being opened and closed at the front end thereof. The discharge port 331*b* is opened when the developer is to be replaced due to deterioration of the carrier contained in the developer, and the developer is discharged from the inside of the accommodating unit 331 through the discharge port 331*b*. The filling port 331*c* is opened when the developing unit 33 is to be filled with the developer or toner, and the developer or toner is introduced into the accommodating unit 331 through the filling port 331*c*. The operation of opening and closing the discharge port 331*b* and the filling port 331*c* is controlled by for example, the controller 21 (see FIG. 1).

When the image forming section 20 (see FIG. 1) of the print unit 1B forms an image, the toner is supplied form the developing roller 332 to the photoconductor drum 31 in the developing unit 33, so that a toner image is formed. Thus, the toner is consumed and the toner concentration in the developer contained in the accommodating unit 331 of the developing unit 33 is reduced. Therefore, for example, when the toner concentration in the developer contained in the accommodating unit 331 becomes less than or equal to a predetermined concentration, the filling port 331*c* is opened and toner is supplied through the filling port 331*c* from a hopper (not illustrated).

When the image forming section 20 forms an image, the carrier contained in the developer in the accommodating unit 331 is deteriorated by, for example, wear. Therefore, the developer in the accommodating unit 331 is replaced when, for example, the number of times the print unit 1B has been operated reaches or exceeds a predetermined number. In this case, first, the discharge port 331*b* is opened and the developer is discharged from the inside of the accommodating unit 331. Then, the discharge port 331*b* is closed and the filling port 331*c* is opened to allow new developer to be introduced into the accommodating unit 331.

When the developer is to be discharged from the inside of the accommodating unit 331, the developing unit 33 performs an operation different from that for image formation to clean the inside of the accommodating unit 331, and thereby discharges a large amount of developer. More specifically, in the second operation mode, which is an operation mode for cleaning, the developing unit 33 operates the developing roller 332, the pickup roller 333, and the first to third transport units 334 to 336 individually. The developing unit 33 includes a drive mechanism capable of operating these components individually.

Drive Mechanism for Developing Unit 33

As illustrated in FIG. 3, the drive mechanism of the developing unit 33 includes a first drive unit 51, a second drive unit 52, and a third drive unit 53. The first drive unit 51 includes a motor for rotating the developing roller 332, and is disposed at a position corresponding to the position of the developing roller 332 at the rear of the developing unit 33 in the example illustrated in FIG. 3. The second drive unit

52 includes a motor for rotating the pickup roller 333, and is disposed at a position corresponding to the position of the pickup roller 333 at the front of the developing unit 33 in the example illustrated in FIG. 3. The third drive unit 53 includes a motor for rotating the first to third transport units 334 to 336, and is disposed at a position corresponding to the position of the first to third transport units 334 to 336 at the rear of the developing unit 33 in the example illustrated in FIG. 3. The third drive unit 53 is assumed to simultaneously drive the first to third transport units 334 to 336 using one motor, but may have a structure including plural motors or a structure including gears and clutches for changing driven objects so that the first to third transport units 334 to 336 may be driven individually.

Operation of Developing Unit 33

The developing unit 33 operates in either the first operation mode, which is an operation mode for normal image formation, or the second operation mode, which is an operation mode for cleaning the inside of the accommodating unit 331, for example, for replacement of the developer. The operation mode is switched between the first operation mode and the second operation mode by, for example, the controller 21 (see FIG. 1).

In the first operation mode, the developing unit 33 causes the first to third drive units 51 to 53 to operate the developing roller 332, the pickup roller 333, and the first to third transport units 334 to 336 simultaneously. Accordingly, the developer contained in the accommodating unit 331 of the developing unit 33 is transported by the first to third transport units 334 to 336 to the pickup roller 333 and then supplied to the developing roller 332. The developing roller 332 forms a toner image on the photoconductor drum 31. The developer remaining on the developing roller 332 after the image is developed on the photoconductor drum 31 is removed by the removing member 338 and returned to the transport path composed of the first to third transport units 334 to 336 in the accommodating unit 331.

In the second operation mode, the developing unit 33 individually causes the first drive unit 51 to drive the developing roller 332, the second drive unit 52 to drive the pickup roller 333, and the third drive unit 53 to drive the first to third transport units 334 to 336. In the cleaning operation, the developing roller 332 is operated so that the developer on the surface of the developing roller 332 is scraped off by the removing member 338. In this operation, when the pickup roller 333 and the first to third transport units 334 to 336 are also operated, the developing roller 332 from which the developer has been scraped off receives new developer supplied thereto, and the new developer adheres to the surface of the developing roller 332. Therefore, in the second operation mode, the developing roller 332, the pickup roller 333, and the first to third transport units 334 to 336 are operated individually so that the developer is not supplied to the member from which the developer is removed.

The operation in the second operation mode may be performed in accordance with, for example, the following procedure. First, the pickup roller 333 is operated while the first to third transport units 334 to 336 are stopped so that the developer on the pickup roller 333 is transferred to the developing roller 332, and the developing roller 332 is operated to remove the developer on the developing roller 332. After that, the first to third transport units 334 to 336 are operated while the pickup roller 333 and the developing roller 332 are stopped, so that the developer is discharged through the discharge port 331*b*. The operation of the first to third transport units 334 to 336 in the second operation mode for discharging the developer differs from the operation of the first to third transport units 334 to 336 in the first operation mode for image formation.

Figure 4:
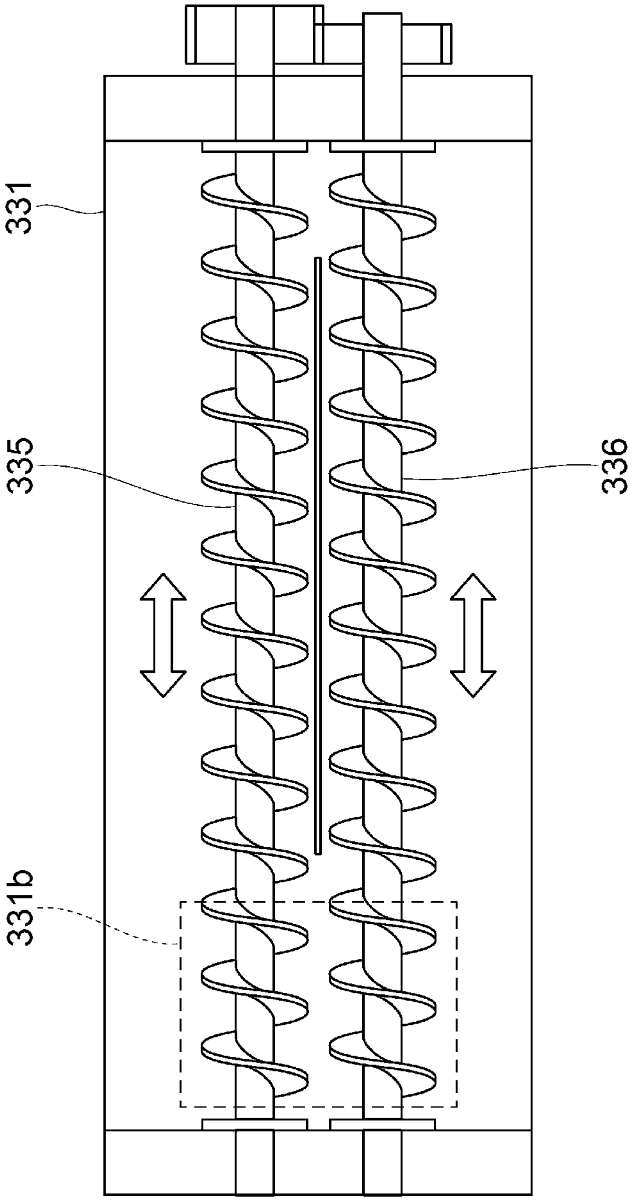
FIG. 4 illustrates the operation of first to third transport units in a second operation mode.

FIG. 4 illustrates the operation of the first to third transport units 334 to 336 in the second operation mode. FIG. 4 is the bottom view of the first to third transport units 334 to 336 of the developing unit 33 seen through the accommodating unit 331, and only the second transport unit 335 and the third transport unit 336 at the lowermost location are illustrated. Although the first transport unit 334, which is positioned above the second transport unit 335 and the third transport unit 336, is not illustrated in FIG. 2, the first transport unit 334 operates in association with the second transport unit 335 and the third transport unit 336. Other members accommodated in the accommodating unit 331 are also not illustrated in FIG. 4. In FIG. 4, the discharge port 331*b* provided in the accommodating unit 331 (not illustrated) is shown by the dashed lines.

In the second operation mode, the first to third transport units 334 to 336 repeat an operation of transporting the developer in the forward direction as in the first operation mode and an operation of transporting the developer in a direction opposite to the forward direction (hereinafter referred to as a "reverse direction") multiple times. When the developer accumulates on the bottom of the accommodating unit 331, the developer agglomerates and forms a layer (residual layer). In the second operation mode, the first to third transport units 334 to 336 repeat the operation in the forward direction and the operation in the reverse direction to disintegrate the residual layer and transport the disintegrated developer.

Figure 5:
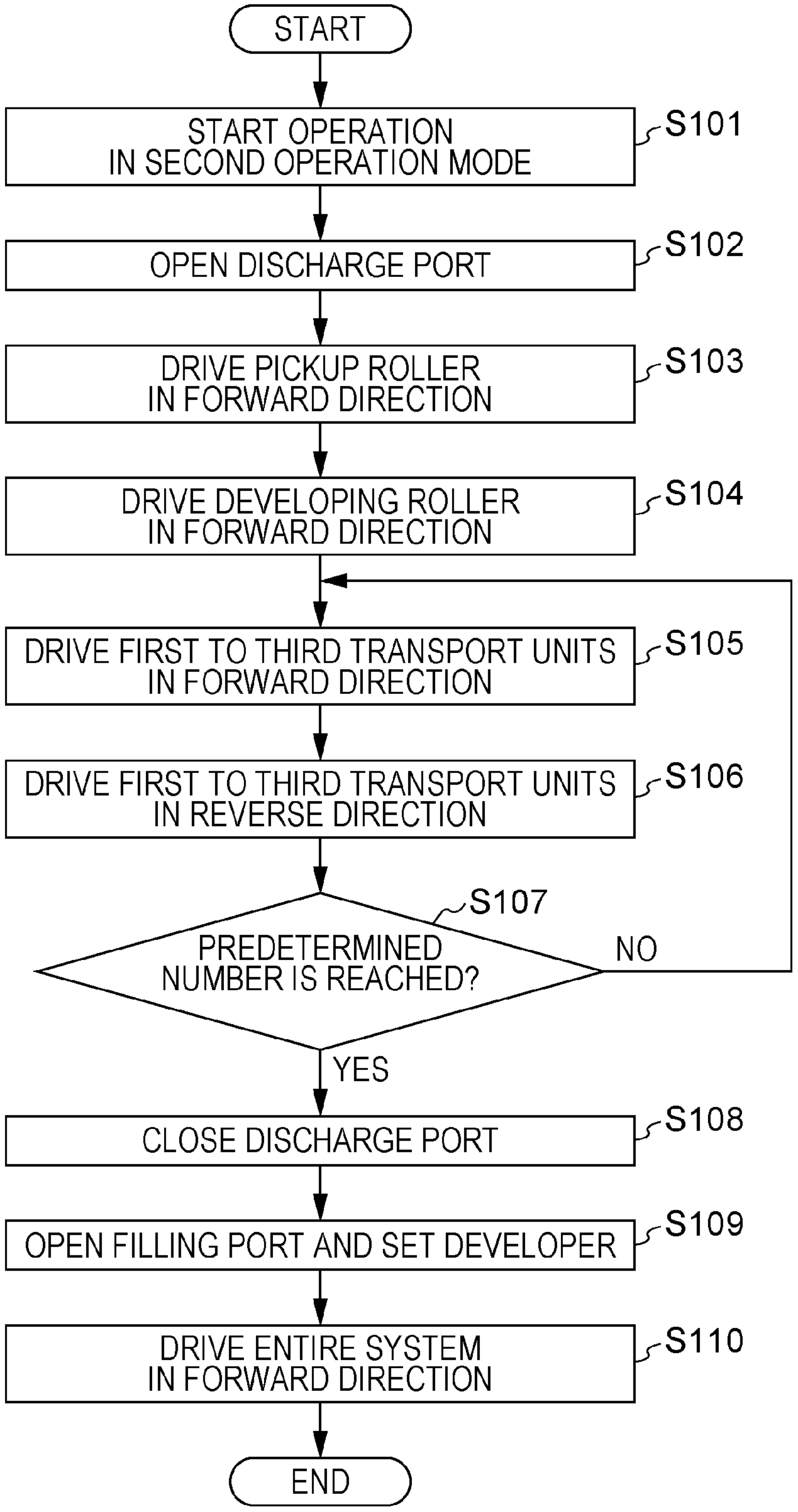
FIG. 5 is a flowchart of an operation of the developing unit in the second operation mode.

FIG. 5 is a flowchart showing the operation of the developing unit 33 in a second operation mode. When the operation in the second operation mode is started to replace the developer in the developing unit 33 and clean the inside of the accommodating unit 331 (S101), the discharge port 331*b* of the accommodating unit 331 is opened (S102), and the developing roller 332, the pickup roller 333, and the first to third transport units 334 to 336 are driven by the first to third drive units 51 to 53 in the second operation mode.

In the operation of the first to third drive units 51 to 53 in the second operation mode, first, the second drive unit 52 drives the pickup roller 333 in the forward direction (S103). Accordingly, the developer on the pickup roller 333 is transfer to the developing roller 332. At this time, only the pickup roller 333 is operated, and the developing roller 332 and the first to third transport units 334 to 336 are stopped. Therefore, the developer is not supplied from the first to third transport units 334 to 336 to the pickup roller 333.

Next, the first drive unit 51 drives the developing roller 332 in the forward direction (S104). Accordingly, the developer on the developing roller 332 is scraped off by the regulating member 337 and the removing member 338. At this time, only the developing roller 332 is operated, and the pickup roller 333 and the first to third transport units 334 to 336 are stopped. Therefore, the developer is not supplied from the pickup roller 333 to the developing roller 332.

Next, the third drive unit 53 repeatedly drives the first to third transport units 334 to 336 in the forward and reverse directions multiple times. More specifically, first, the third drive unit 53 drives the first to third transport units 334 to 336 in the forward direction for a certain period of time (S105), and then drives the first to third transport units 334 to 336 in the reverse direction for a certain period of time (S106). The third drive unit 53 repeats this operation a predetermined number of times (S107). The third drive unit 53 repeatedly drives the first to third transport units 334 to 336 in the forward direction (S105) and in the reverse direction (S106) while the predetermined number of times is not reached (NO in S107), and stops driving the first to third transport units 334 to 336 when the predetermined number of times is reached (YES in S107). Although an execution time of the operation for each direction is not particularly limited, since the operation is performed to discharge the developer in the accommodating unit 331, the execution time may be set to a time in which the developer is transported from one end to the other end of one transport unit (for example, the third transport unit 336) and may be, for example, about 20 seconds. The number of times the driving in the forward direction and the driving in the reverse direction are repeated is not particularly limited and may be, for example, three or four.

After the operation in which the third drive unit 53 drives the first to third transport units 334 to 336 is ended, the discharge port 331*b* is closed (S108). Then, the filling port 331*c* is opened, and a container (for example, a hopper) containing the developer is set to the filling port 331*c* (S109). After that, the first to third drive units 51 to 53 drive the developing roller 332, the pickup roller 333, and the first to third transport units 334 to 336 in the forward direction (S110).

Thus, the developer is introduced into the accommodating unit 331 through the filling port 331*c*, and replacement of the developer is completed. The operation described above with reference to FIG. 5 is merely an example of the operation of the developing unit 33 in the second operation mode, and the operation in the second operation mode is not limited to the procedure illustrated in FIG. 5 as long as the developer may be removed from the developing roller 332 and the pickup roller 333 while the supply of the developer from the first to third transport units 334 to 336 is stopped. For example, in the above-described example, the pickup roller 333 is operated, and then the developing roller 332 is operated (S103 and S104). However, when the first to third transport units 334 to 336 are stopped, the developing roller 332 and the pickup roller 333 may be operated simultaneously. When the first to third transport units 334 to 336 are driven in the forward and reverse directions (S105 to 107), the developing roller 332 may also be operated because the developer is not supplied to the developing roller 332 as long as the pickup roller 333 is stopped.

Modification

In the above-described example, the developing unit 33 includes the developing roller 332, the pickup roller 333, and the first to third transport units 334 to 336. The developing unit 33 may include no pickup roller 333 depending on the type thereof. In such a structure, the developer transported by the first to third transport units 334 to 336 is directly supplied from the third transport unit 336 to the developing roller 332. When the developing unit 33 having such a structure operates in the second operation mode (see FIG. 5), S103 is omitted after the discharge port 331*b* is opened in S102, and the developing roller 332 is driven first (S104). Then, the first to third transport units 334 to 336 are driven (S105 to S107), the discharge port is closed (S108), and the filling port 331*c* is opened to introduce the developer (S109 and S110).

In the developing unit 33 having the above-described structure, the first to third drive units 51 to 53 of the drive mechanism include the respective motors to individually drive the developing roller 332, the pickup roller 333, and the first to third transport units 334 to 336. In contrast, the drive mechanism may include one drive source (motor) and a mechanism including gears for transmitting the driving force, and be configured to distribute the driving force between the developing roller 332, the pickup roller 333, and the first to third transport units 334 to 336.

Figure 6:
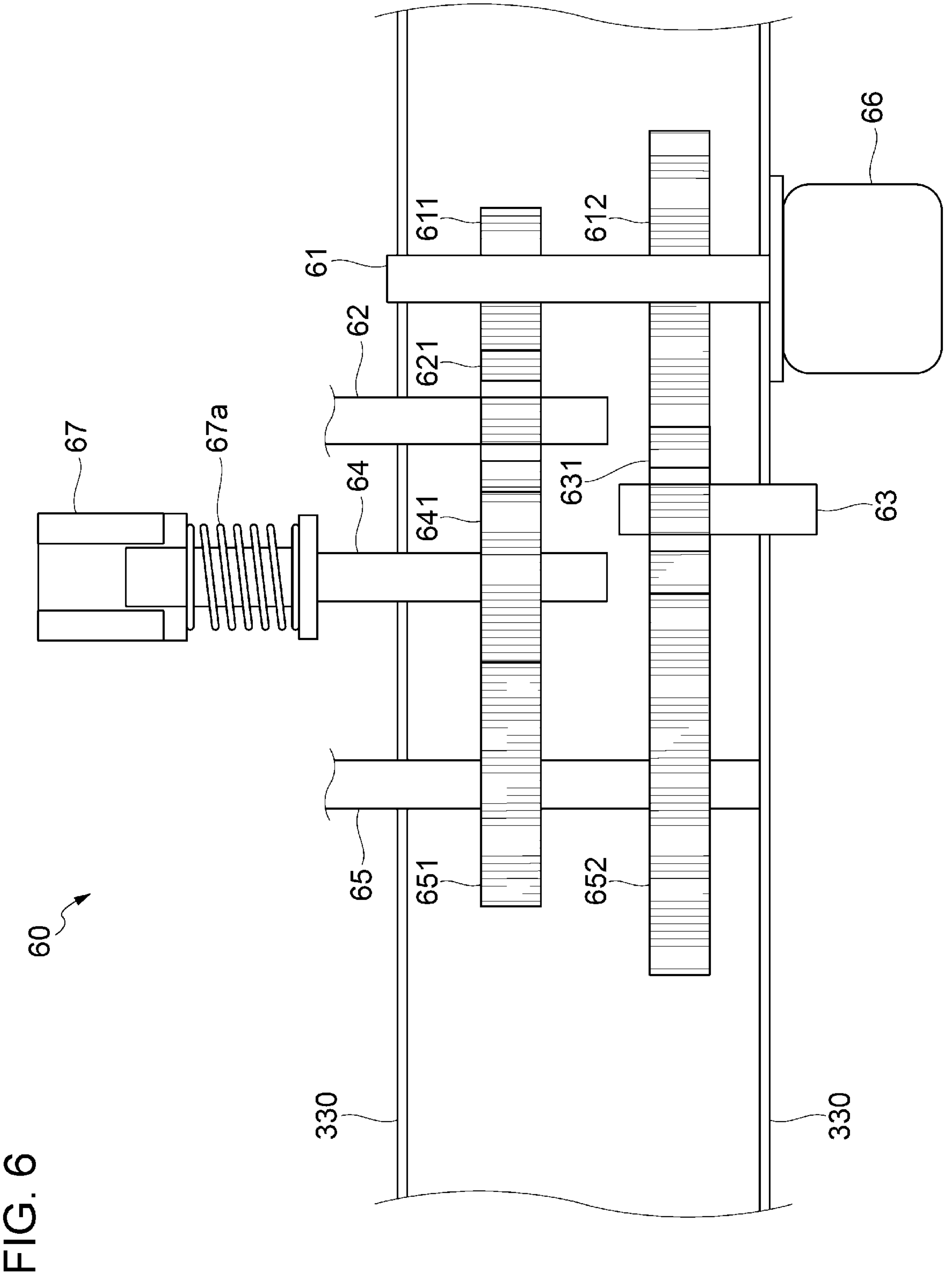
FIG. 6 illustrates an example of the structure of a drive mechanism that distributes a driving force when a solenoid switch is OFF.
Figure 7:
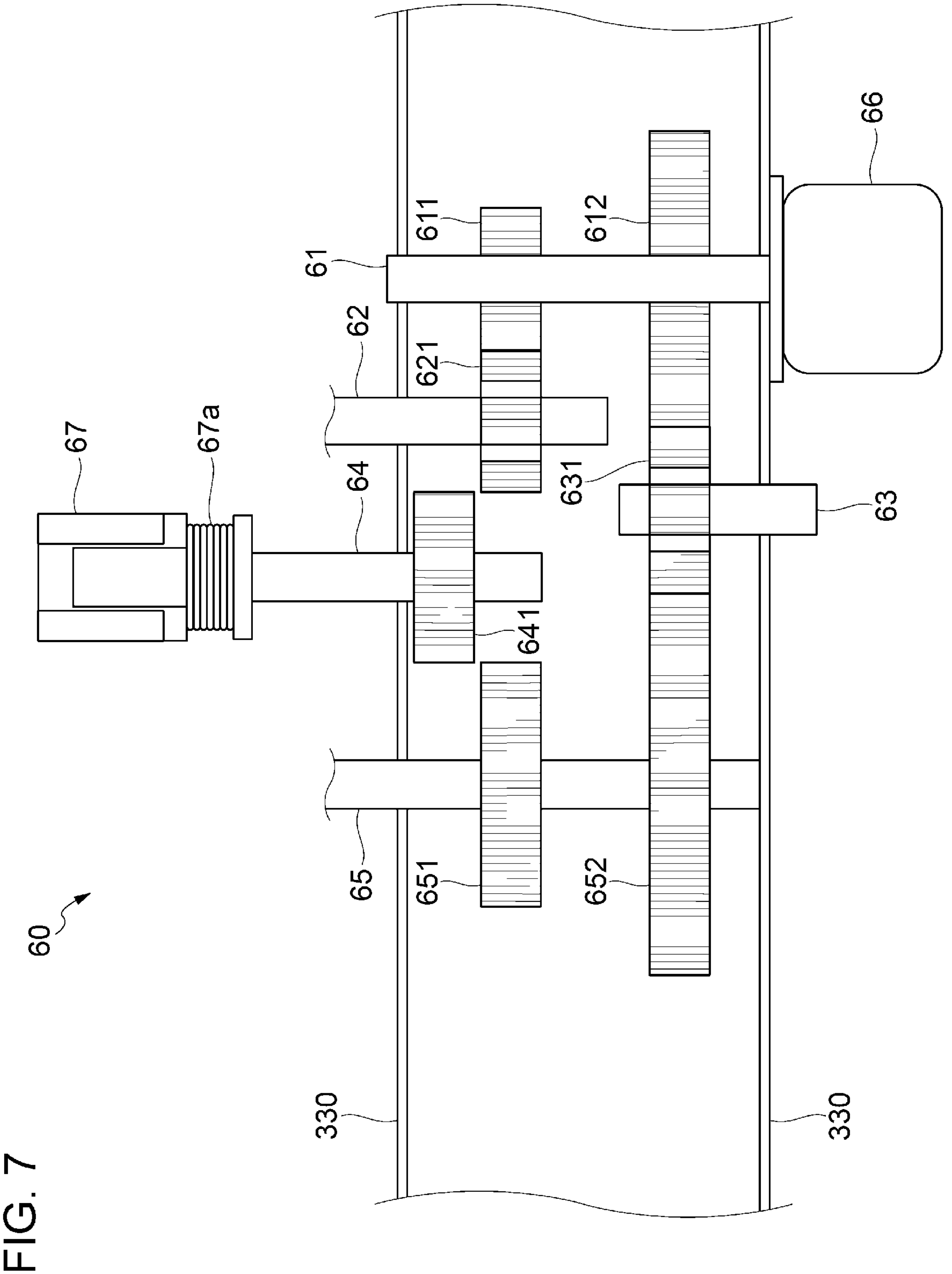

FIGS. 6 and 7 illustrate an example of the structure of a drive mechanism that distributes the driving force. In the example illustrated in FIGS. 6 and 7, the developing unit 33 includes no pickup roller 333, and includes only the developing roller 332 and the first to third transport units 334 to 336. In this case, in the second operation mode, the developing roller 332 and the first to third transport units 334 to 336 operate individually.

A drive mechanism 60 illustrated in FIG. 6 includes plural rotating shafts 61 to 65 attached to the frame 330 of the developing unit 33, gears provided on the rotating shafts, a motor 66, and a solenoid switch 67. The rotating shaft 61 is a motor shaft of the motor 66. A gear 611 and a gear 612 are provided on the rotating shaft 61. The rotating shaft 62 is a drive shaft that drives the first to third transport units 334 to 336. A gear 621 is provided on the rotating shaft 62. The gear 621 is attached to the rotating shaft 62 by a one-way clutch. The rotating shaft 63 is a rotating shaft for transmitting the driving force. A gear 631 is provided on the rotating shaft 63. The gear 631 is attached to the rotating shaft 63 by a one-way clutch. The rotating shaft 64 is a rotating shaft for transmitting the driving force. A gear 641 is provided on the rotating shaft 64. The rotating shaft 64 is attached to the solenoid switch 67. The rotating shaft 65 is a drive shaft that drives the developing roller 332. A gear 651 and a gear 652 are provided on the rotating shaft 65.

The motor 66 generates the driving force for driving the developing roller 332 and the first to third transport units 334 to 336. The solenoid switch 67 includes a solenoid 67*a* and is switched ON (the solenoid 67*a* is energized) or OFF (the solenoid 67*a* is deenergized) so that the rotating shaft 64 moves backward or forward in an axial direction. In the example illustrated in FIGS. 6 and 7, the solenoid 67*a* contracts to move the rotating shaft 64 backward (FIG. 7) when the solenoid switch 67 is ON, and expands to move the rotating shaft 64 forward (FIG. 6) when the solenoid switch 67 is OFF.

The driving force is transmitted along two paths. One path transmits the driving force from the gear 611 on the rotating shaft 61 to the gear 621 on the rotating shaft 62, the gear 641 on the rotating shaft 64, and the gear 651 on the rotating shaft 65 in that order. This path is referred to as a first path. The other path transmits the driving force from the gear 612 on the rotating shaft 61 to the gear 631 on the rotating shaft 63 and the gear 652 on the rotating shaft 65 in that order. This path is referred to as a second path. The first path has the one-way clutch attached to the gear 621, and therefore the rotating shaft 62, which is the drive shaft of the first to third transport units 334 to 336, rotates only in one direction. When the solenoid switch 67 is ON, the rotating shaft 64 is moved backward so that the gear 641 is not in contact with the gear 621 and the gear 651, and accordingly, the driving force is not transmitted to the rotating shaft 65, which is the drive shaft of the developing roller 332. The second path has the one-way clutch attached to the gear 631, and therefore the rotating shaft 65, which is the drive shaft of the developing roller 332, rotates only in one direction.

The drive mechanism 60 performs three types of operations: an operation in the first operation mode in which the developing roller 332 and the first to third transport units 334 to 336 are simultaneously driven; an operation in the second operation mode in which only the developing roller 332 is driven; and an operation in the second operation mode in which only the first to third transport units 334 to 336 are driven. The drive mechanism 60 illustrated in FIGS. 6 and 7 performs these operations by changing the rotation direction of the motor 66 and switching ON or OFF the solenoid switch 67. Assume that the motor 66 rotates in a counterclockwise (CCW) direction to drive the rotating shaft 62 (drive shaft of the first to third transport units 334 to 336) through the one-way clutch on the gear 621. The motor 66 rotates in a clockwise (CW) direction to rotate the gear 652 through the one-way clutch on the gear 631 and thereby drive the rotating shaft 65 (drive shaft of the developing roller 332).

In the operation in the first operation mode for image formation, the developing roller 332 and the first to third transport units 334 to 336 are driven simultaneously. In this case, the motor 66 rotates in the CCW direction, and the solenoid switch 67 is set to OFF (see FIG. 6). On the first path, the driving force of the motor 66 is transmitted from the rotating shaft 61 to the rotating shaft 62 through the gear 611 and the gear 621 to drive the first to third transport units 334 to 336, and is further transmitted from the gear 621 to the rotating shaft 65 through the gear 641 and the gear 651 to drive the developing roller 332. On the second path, the transmission of the driving force is interrupted by the one-way clutch on the gear 631 when the motor 66 rotates in the CCW direction. Therefore, the second path does not contribute to the transmission of the driving force for driving the developing roller 332.

In the operation in the second operation mode for cleaning, the developing roller 332 and the first to third transport units 334 to 336 are driven individually. When only the developing roller 332 is to be driven, the motor 66 rotates in the CW direction. On the first path, when the motor 66 rotates in the CW direction, the transmission of the driving force is interrupted by the one-way clutch on the gear 621. Therefore, the first path does not contribute to the transmission of the driving force for driving the first to third transport units 334 to 336 and the developing roller 332. On the first path, the above-described operation is not affected by whether the solenoid switch 67 is ON or OFF. On the second path, the driving force of the motor 66 is transmitted from the rotating shaft 61 to the rotating shaft 65 through the gears 612, 631, and 652, and drives the developing roller 332. Since the driving force is transmitted to drive the first to third transport units 334 to 336 only along the first path, the first to third transport units 334 to 336 are not driven when the motor 66 rotates in the CW direction.

When only the first to third transport units 334 to 336 are to be driven, the motor 66 rotates in the CCW direction, and the solenoid switch 67 is set to ON (see FIG. 7). On the first path, the driving force of the motor 66 is transmitted from the rotating shaft 61 to the rotating shaft 62 through the gear 611 and the gear 621 to drive the first to third transport units 334 to 336. However, since the solenoid switch 67 is ON and the gear 641 is moved backward, the driving force is not transmitted from the gear 621 to the gear 651, and the developing roller 332 is not driven. On the second path, the transmission of the driving force is interrupted by the one-way clutch on the gear 631 when the motor 66 rotates in the CCW direction. Therefore, the second path does not contribute to the transmission of the driving force for driving the developing roller 332.

As described above, the rotation direction of the motor 66 and the ON/OFF state of the solenoid switch 67 are controlled to perform the operation in the first operation mode, the operation of driving only the developing roller 332 in the second operation mode, and the operation of driving only the first to third transport units 334 to 336 in the second operation mode. The structure of the drive mechanism 60 illustrated in FIGS. 6 and 7 is merely an example. Other structures may be applied as long as the driving force of the motor may be distributed to the developing roller 332 and the first to third transport units 334 to 336 to drive the developing roller 332 and the first to third transport units 334 to 336 simultaneously or to drive either the developing roller 332 or the first to third transport units 334 to 336.

While an exemplary embodiment of the present disclosure has been described, the technical scope of the present disclosure is not limited to the above-described exemplary embodiment. The present disclosure includes various modifications and structural replacements made without departing from the technical scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

A developing device including:

a developer holder that supplies developer to an image carrier on which an electrostatic latent image is formed;

a removing member that removes the developer that has not been supplied to the image carrier and remains on the developer holder;

a transport unit that includes a helical rotating body, the transport unit rotating the rotating body to transport the developer and supply the developer to the developer holder;

an accommodating unit that accommodates the developer holder, the removing member, and the transport unit; and a drive mechanism that operates the developer holder and the transport unit together in a first operation mode for image formation and operates the developer holder and the transport unit individually in a second operation mode for cleaning an inside of the accommodating unit by removing the developer.

(((2)))

The developing device according to (((1))), wherein, in the second operation mode, the drive mechanism operates the developer holder and then operates the transport unit while a discharge port provided in the accommodating unit is opened, thereby discharging the developer through the discharge port.

(((3)))

The developing device according to (((2))), wherein, in the second operation mode, the drive mechanism operates the developer holder while the transport unit is stopped.

(((4)))

The developing device according to any one of (((1))) to (((3))), wherein, in the second operation mode, the drive mechanism operates the rotating body of the transport unit in a forward direction and a reverse direction a predetermined number of times, and then operates the transport unit while a discharge port provided in the accommodating unit is opened, thereby discharging the developer through the discharge port.

(((5)))

The developing device according to (((4))), wherein, in the second operation mode, the drive mechanism operates the transport unit while the developer holder is stopped at least when the rotating body of the transport unit is operated in the forward direction and the reverse direction the predetermined number of times.

(((6)))

The developing device according to any one of (((1))) to (((5))), further including:

a developer relay unit on which the developer transported by the transport unit accumulates and that supplies the developer to the developer holder, wherein the drive mechanism operates the developer holder, the developer relay unit, and the transport unit together in the first operation mode and operates the developer holder, the developer relay unit, and the transport unit individually in the second operation mode.

(((7)))

The developing device according to any one of (((1))) to (((6))), wherein, in the second operation mode, the drive mechanism operates the developer relay unit, operates the developer holder, and then operates the transport unit while a discharge port provided in the accommodating unit is opened, thereby discharging the developer through the discharge port.

(((8)))

An image forming apparatus including the developing device according to any one of (((1))) to (((7))).

What is claimed is:

1. A developing device comprising:

a developer holder configured to supply developer to an image carrier on which an electrostatic latent image is formed;

a removing member configured to remove the developer that has not been supplied to the image carrier and remains on the developer holder;

a transport unit comprising a helical rotating body, wherein the transport unit is configured to rotate the helical rotating body to transport the developer and supply the developer to the developer holder;

an accommodating unit that accommodates the developer holder, the removing member, and the transport unit; and a drive mechanism configured to operate the developer holder and the transport unit together in a first operation mode for image formation and to operate the developer holder and the transport unit individually in a second operation mode for cleaning an inside of the accommodating unit by removing the developer, wherein the drive mechanism is configured to, in the second operation mode, operate the helical rotating body of the transport unit in a forward direction and a reverse direction a predetermined number of times, and then operate the transport unit while a discharge port provided in the accommodating unit is opened, thereby discharging the developer through the discharge port, and wherein the drive mechanism is configured to, in the second operation mode, operate the transport unit while the developer holder is stopped at least when the helical rotating body of the transport unit is operated in the forward direction and the reverse direction the predetermined number of times.

2. The developing device according to claim 1, wherein the drive mechanism is configured to, in the second operation mode, operate the developer holder, and then operate the transport unit while a discharge port provided in the accommodating unit is opened, thereby discharging the developer through the discharge port.

3. The developing device according to claim 2, wherein the drive mechanism is configured to, in the second operation mode, operate the developer holder while the transport unit is stopped.

4. An image forming apparatus comprising:

the developing device according to claim 3.

5. An image forming apparatus comprising:

the developing device according to claim 2.

6. The developing device according to claim 1, further comprising:

a developer relay unit configured to accumulate the developer transported by the transport unit and to supply the developer to the developer holder, wherein the drive mechanism is configured to operate the developer holder, the developer relay unit, and the transport unit together in the first operation mode and to operate the developer holder, the developer relay unit, and the transport unit individually in the second operation mode.

7. The developing device according to claim 6, wherein the drive mechanism is configured to, in the second operation mode, operate the developer relay unit, the developer holder, and then operate the transport unit while a discharge port provided in the accommodating unit is opened, thereby discharging the developer through the discharge port.

8. An image forming apparatus comprising:

the developing device according to claim 7.

9. An image forming apparatus comprising:

the developing device according to claim 6.

10. An image forming apparatus comprising:

the developing device according to claim 1.

11. A developing device comprising:

a developing roller configured to supply developer to an image carrier on which an electrostatic latent image is formed;

a scraper configured to remove the developer that has not been supplied to the image carrier and remains on the developing roller;

a helical rotating body, wherein the helical rotating body is configured to rotate to transport the developer and supply the developer to the developing roller;

a container that accommodates the developing roller, the scraper, and the helical rotating body; and a drive mechanism configured to operate the developing roller and the helical rotating body together in a first operation mode for image formation and to operate the developing roller and the helical rotating body individually in a second operation mode for cleaning an inside of the container by removing the developer, wherein the drive mechanism is configured to, in the second operation mode, operate the helical rotating body in a forward direction and a reverse direction a predetermined number of times, and then operate the helical rotating body while a discharge port provided in the container is opened, thereby discharging the developer through the discharge port, and wherein the drive mechanism is configured to, in the second operation mode, operate the helical rotating body while the developer holder is stopped at least when the helical rotating body is operated in the forward direction and the reverse direction the predetermined number of times.

* * * * *